United States Patent [19]
Horvath

[11] 4,043,914
[45] * Aug. 23, 1977

[54] AQUARIUM PUMP WITH AERATION

[75] Inventor: Tibor Horvath, Brooklyn, N.Y.

[73] Assignee: Aquology Corporation, Newark, N.J.

[*] Notice: The portion of the term of this patent subsequent to July 10, 1990, has been disclaimed.

[21] Appl. No.: 715,701

[22] Filed: Aug. 19, 1976

[51] Int. Cl.² .............................................. E04H 3/16
[52] U.S. Cl. .................................. 210/169; 415/215; 417/424
[58] Field of Search ............. 210/169; 261/64 R, 171; 415/215; 417/424

[56] References Cited
U.S. PATENT DOCUMENTS 3,738,620   6/1973   Ennis .................................... 210/169
3,744,635   7/1973   Horrath ................................ 210/169

Primary Examiner—Theodore A. Granger
Attorney, Agent, or Firm—Peter L. Tailer

[57] ABSTRACT

A pump has a large upper chamber containing an outlet, a smaller lower chamber containing an inlet, a flared transition portion between the lower and upper chambers, a driven vertical impeller extending within the chambers and the transition portion, and an aeration device in the transition portion, the aeration device being a projection into the transition portion with an upward slope facing the movement of the impeller therepast and an edge in the direction of rotation of the impeller, and an air valve controlling air flow through a channel leading into the pump at the edge of the projection.

6 Claims, 4 Drawing Figures

AQUARIUM PUMP WITH AERATION

BACKGROUND OF THE INVENTION

1. Field of the Invention

This invention relates to aquarium pumps and aeration devices which introduce controlled amounts of air into the pump outlet stream to oxidize impurities and provide oxygen for fish.

2. Description of the Prior Art

In conventional practice aeration is accomplished by providing a constriction in an aquarium pump outlet tube to cause a venturi effect and a sufficient pressure drop to enable air to be drawn into the outlet stream.

SUMMARY OF THE INVENTION

An aquarium pump has a housing containing a large upper chamber, a smaller lower chamber, and a flared transition portion connecting said chambers, a driven vertical impeller having a larger portion in said upper chamber and a smaller portion in said lower chamber, an outlet leading from said upper chamber, an inlet at the bottom of said lower chamber, and an aeration device, said aeration device having a projection or rib within said transition portion with an upward slope facing the direction of rotation of said impeller therepast and an edge in the direction of rotation of said impeller, said transition portion containing a channel at the edge of said projection, and an air valve controlling flow of air through said channel into pumped water in said housing. The air valve is best formed as an integral downward extension of said housing below said channel, said downward extension containing a cylindrical opening communicating with said channel and containing a slot extending upward adjacent to the lower end of said cylindrical opening, a cylindrical stem extending into said cylindrical opening above said slot, said stem having a flat side extending at least from the top of said slot to the top of said stem, and an aeration control lever fixed to the lower end of said stem rotating said stem controlling air flow through said slot past said flat side of said stem.

The location of the aeration device of this invention in the transition portion of the pump housing provides many advantages. Water, moving upward in the housing, expands at the transition portion to provide a pressure drop which is further increased at the downstream side of the projection. This results in a larger suction to pull air into the housing. This is an advantage as a given air flow through a smaller valve setting at a higher suction will provide smaller air bubbles. In addition, air is introduced into the housing below the upper portion of the impeller which further breaks up air bubbles. This enables this invention to provide more than 50 percent more air than a conventional pump with an outlet tube aerator. Further, the location of the air valve of this particular pump enables the valve to be molded integrally with the housing and it locates the valve where it can easily be reached for control.

To even attempt to obtain aeration comparable to that of this invention in conventional pump outlet devices, a large constriction must be provided that greatly reduces the pump outlet flow for a pump of a given capacity. Further, when conventional aeration is increased, large air bubbles result which make unsightly foam and do not oxidize impurities. The passage of air bubbles past the top of the impeller of this invention breaks up any large bubbles to provide effective increased aeration.

DESCRIPTION OF THE PREFERRED EMBODIMENT

Figure 1:
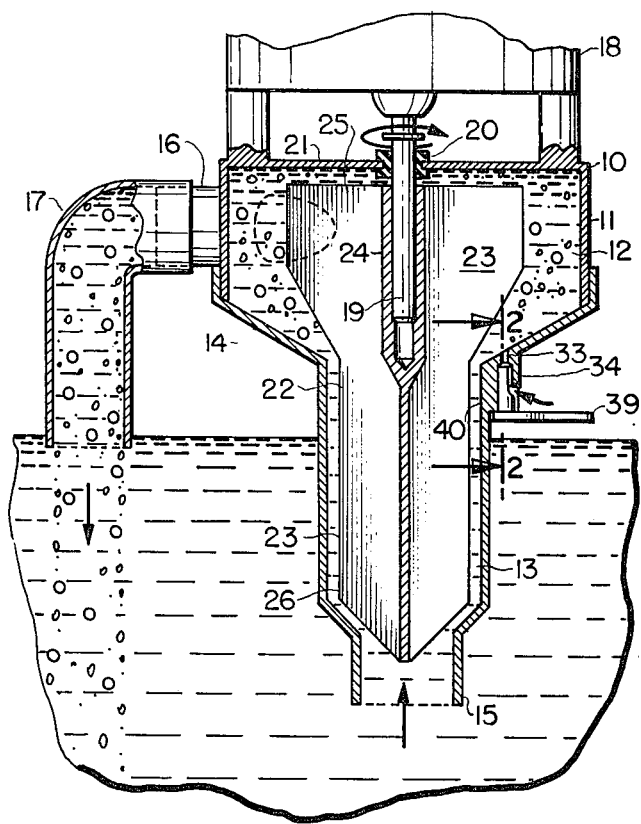
FIG. 1 is a is a longitudinal, vertical section through an aquarium pump and aeration device according to this invention, the pump motor being broken away and the pump being shown pumping water.

As shown in FIG. 1, an aquarium pump 10 has a housing 11 containing a large upper chamber 12, a smaller lower chamber 13, and an intermediate upwardly flared transition portion 14 therebetween. An inlet 15 is at the bottom of lower chamber 13 and a tangential outlet 16 leads from upper chamber 12 to be connected to a discharge tube 17. Pump 10 is shown merely recirculating and aerating water. Usually pump 10 would be in a filter tank returning water to an aquarium tank and aerating it at the same time.

Motor 18 has a vertical shaft 19 which extends through seal 20 in the top wall 21 of housing 11. Impeller 22 with radially extending vertical vanes 23 is mounted on shaft 19 by hub 24. Impeller 22 has a larger upper portion 25 which extends into chamber 12 above the transition portion 14. It also has a smaller lower portion 26 which extends downward in lower chamber 13.

Figure 2:
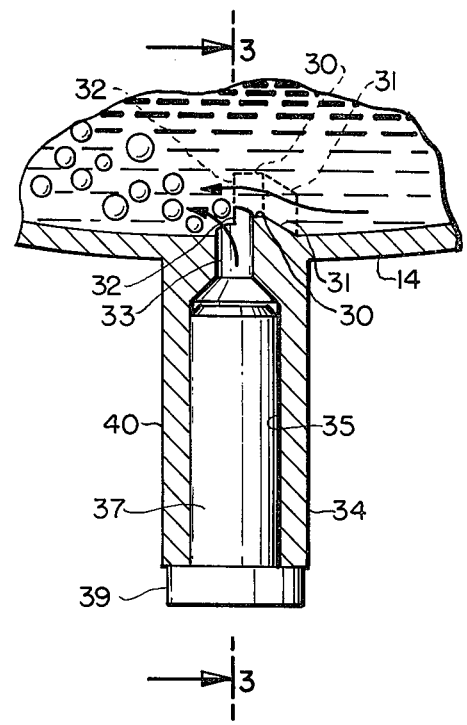
FIG. 2 is a section taken on line 2—2 of FIG. 1.
Figure 3:
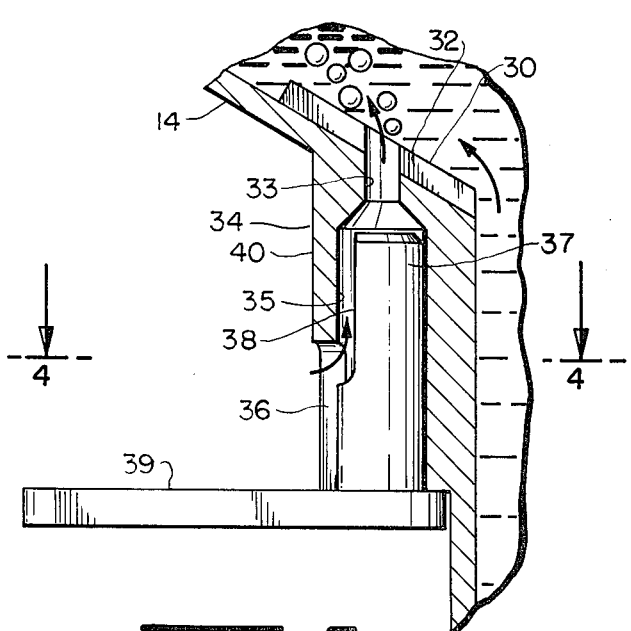
FIG. 3 is a section taken on line 3—3 of FIG. 2.

As shown in FIGS. 2 and 3, a rib or projection 30 extending radially within transition portion 14 has a gentle upward slope 31 facing in the direction of the movement of vanes 23 toward it. Projection 30 has a preferrably vertical edge 32 facing in the direction of the rotation of vanes past it. Thus slope 31 is on the upstream side of projection 30 and edge 32 is on its downstream side. Transition 14 contains a small vertical channel 33 through it at or near the edge 32.

Figure 4:
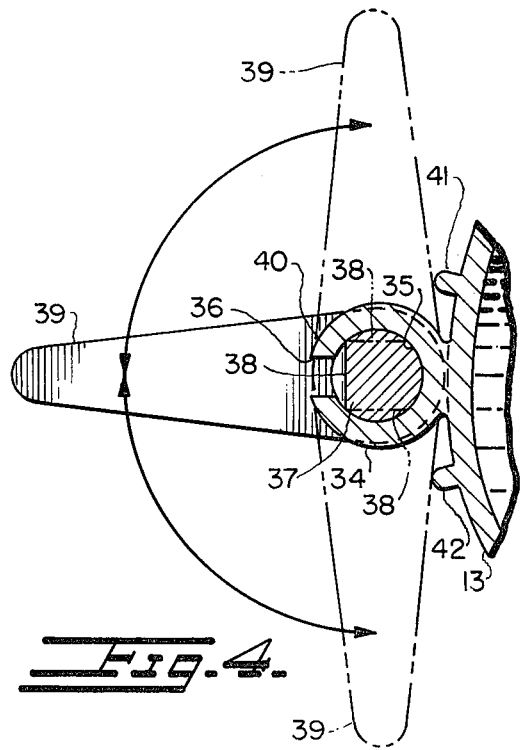
FIG. 4 is a section taken on line 4—4 of FIG. 3.

An air valve 40 is formed by the following elements. An extension 34 is molded integrally with transition 14 and chamber 13 and it contains an upwardly extending cylindrical opening 35 communicating with channel 33. Extension 34 also contains a vertical slot 36 in its lower end. A cylindrical stem 37 having a flat side surface 38 extending downward from its top at least below the top of slot 36 is inserted in opening 35. Stem 37 has a control lever 39 fixed to its lower end so that, as shown in FIG. 4, rotation of lever 39 will rotate stem 37 in opening 35. As shown in solid lines in FIG. 4, air valve 40 is open to admit a maximum flow of air. In the positions shown in phantom lines, valve 40 is closed. Stops 41 and 42 limit the movement of control lever 39 to 180°. Valve 40 can be set to admit any desired amount of air. The flow of air admitted is usually determined by visual observation of the outlet tube 17 and of aquarium conditions.

The aeration provided by this invention is particularly effective as a relatively large amount of air may be introduced for a given pump capacity as the larger upper portion 25 of impeller 22 will break up any bigger air bubbles. In pump 10 rising water expands when it reaches transition portion 14 to provide a pressure drop which is further increased by projection 30. The greatest pressure drop in transition 14 is adjacent to lower chamber 13. Air valve 40 is particularly inexpensive to manufacture as extension 34, channel 33, cylindrical opening 35, and slot 36 can be molded with housing 11 without requiring any cam action in the mold used to form these elements.

What is claimed is:

1. A pump with aeration for an aquarium filter tank, said filter tank having filter material, means supporting said filter material, and a suction outlet drawing from below said filter material, said pump comprising, in combination, a housing containing a large cylindrical upper chamber disposed at least partly above the top of said filter tank and having a tangential outlet extending out over the top of said filter tank, a smaller lower chamber extending downward to connect with said suction outlet, and a flared transition portion between said chambers, a motor fixed on top of said casing and having a vertical shaft entering said casing, a vertical impeller mounted on said shaft having a large upper portion extending above said transition portion into said upper chamber and having a smaller lower portion extending in said lower chamber below the level of water in said filter tank, said smaller lower portion priming said upper chamber by raising water into said upper chamber where efficient pumping takes place, a projection within said transition portion having an edge in the direction said impeller moves adjacent to said projection, and air valve means controlling the flow of air through said channel into pumped fluid in said housing.

2. The combination according to claim 1 wherein said projection has an upward slope facing the direction of movement of said impeller therepast.

3. The combination according to claim 2 wherein said projection and said channel are disposed in said transition adjacent to said lower chamber.

4. The combination according to claim 3 wherein said projection extends substantially radially from said lower chamber.

5. The combination according to claim 4 wherein said air valve means comprises a downward extension of said housing outside said channel containing a cylindrical opening communicating with said channel and containing a slot extending upward adjacent to the lower end of said cylindrical opening, a cylindrical stem extending into said cylindrical opening above said slot, said stem having a flat side extending at least from the top of said slot to the top of said stem, and control means fixed to the lower end of said stem rotating said stem controlling air flow through said slot past said flat side of said stem to said channel.

6. The combination according to claim 5 wherein said control means is a horizontal lever fixed to said stem projecting outward from said lower chamber.

* * * * *